Feb. 20, 1951  S. L. GOLDSBOROUGH  2,542,809
SINGLE-ELEMENT MODIFIED IMPEDANCE RELAY
Filed March 24, 1948
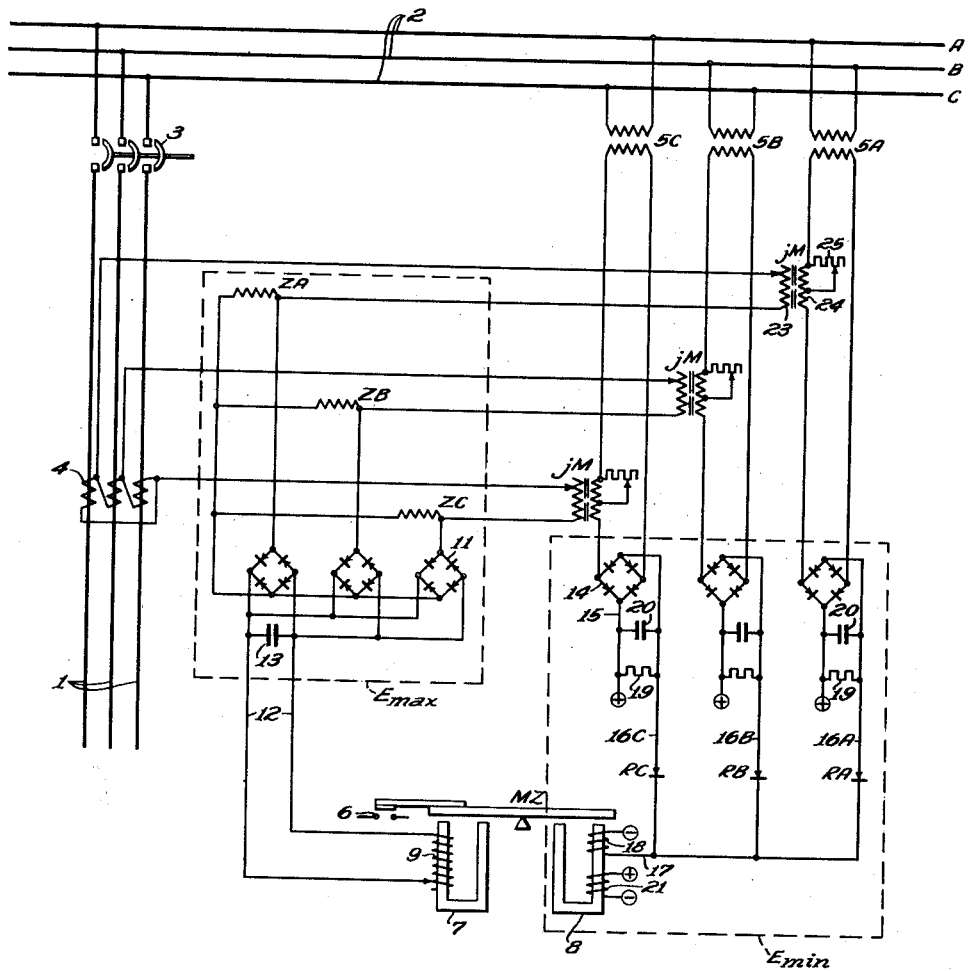
WITNESSES:
Robert C. Baird
Fr. C. Groome
INVENTOR
Shirley L. Goldsborough.
BY O. A. Buchanan
ATTORNEY Patented Feb. 20, 1951

2,542,809

UNITED STATES PATENT OFFICE 2,542,809

SINGLE-ELEMENT MODIFIED IMPEDANCE RELAY

Shirley L. Goldsborough, Basking Ridge, N. J., assignor to Westinghouse Electric Corporation, East Pittsburgh, Pa., a corporation of Pennsylvania Application March 24, 1948, Serial No. 16,872

2 Claims. (Cl. 175—294)

My invention relates to a single-element modified impedance relay which is associated with networks for making the proper phase-selection for responding to a phase-to-phase fault on a three-phase line which is being protected.

My Patents 2,393,983 and 2,404,955, both issued in 1946, show modified-impedance distance-measuring phase-fault detectors, with triple adjustments for adjusting the size and position of the response-circle which shows the relay-characteristic when the balance-points of the relay are plotted on rectangular coordinates in terms of the line-resistance and the line-reactance. This relay-characteristic is a circle having its center displaced from the origin, and lying in a line at an angle which is adjustable, the circle-radius being also adjustable. The previously known modified impedance relays have required a separate element for each phase. In one of the forms of embodiment of this modified impedance relay, which has been found to have very desirable response-characteristics, an instantaneous balanced-beam relay is used, having its operating side adjustably energized in response to the line-current I, and having its restraint-side energized in response to an $(E+I)$ quantity which is vectorially compounded of a response to the line-voltage, plus a variable-magnitude response to the line-current, displaced 90°, and adjustable in phase-angle with respect to said 90° displacement.

An object of my present invention is to provide two networks for selecting the proper phase-quantities to be applied to a single modified impedance element, so that a single element will suffice for all three phases of the protected three-phase line. On the operating side of the relay, the line-current which flows in the faulted phase will be larger than either of the other two line-currents, so that the proper phase can be selected by a maximum-current network such as that which is described in the Harder Patent No. 2,242,950 of 1941. On the restraint-side of the relay, which receives an $(E+I)$ quantity, the magnitude of the I component does not need to be very large, and I have found that this $(E+I)$ quantity is generally the least on the faulted phase, so that the proper phase can be selected by means of a minimum-voltage network, a preferred form of which is shown in my copending application Serial No. 788,583, filed November 28, 1947, now Patent No. 2,504,827, issued April 18, 1950. Both the maximum-voltage network and the minimum-voltage network use rectifiers, so that my single-element modified impedance relay has direct-current energization.

With the foregoing and other objects in view, my invention consists of the circuits, systems, combinations, apparatus, parts, and methods of design and operation described and claimed in the following specification, and illustrated in the accompanying drawing, the single figure of which is a simplified diagrammatic view of circuits and apparatus embodying my invention in an illustrative form of embodiment.

I have illustrated my invention as being applied to the protection of a line-section 1, which may be a part of a three-phase, sixty-cycle transmission or distribution system. The three-phase line 1 is connected to a three-phase bus 2 through line-segregating circuit-interrupting means 3, which is to be controlled by suitable fault-responsive relaying-means.

The illustrated form of embodiment of my invention uses phase-to-phase line-currents, which are derived by means of a bank of delta-connected line-current transformers 4. The illustrated system also uses phase-to-phase line-voltages which are derived from a set of potential-transformers 5A, 5B and 5C, one for each of the line-phases A, B and C.

My modified impedance relay is an instantaneous balanced-beam relay MZ, shown at the bottom of the drawing, and having relay-contacts 6 which are utilized in any of a number of known forms of trip-circuit systems (not shown), for controlling the circuit-interrupter 3 in response to phase-faults on the protected line-section 1. The relay MZ is differentially responsive to the forces exerted by an operating-side electromagnet-frame 7 and a restraint-side electromagnet-frame 8.

As shown in my previously mentioned patents on the modified impedance relay, the operating side of the relay is energized by means of an adjustably tapped operating coil 9 which is adjustably responsive to the magnitude of the line-current in the faulted phase. In accordance with my present invention, this operating-coil 9 is energized by a maximum-voltage network $E_{max}$ which consists of three rectifier-bridges 11 which are impressed with different alternating-current voltages which are obtained by passing the line-currents, in the respective line-phases, through resistors or impedances ZA, ZB and ZC, respectively, one for each phase. The direct-current output-terminals of the three bridges 11 are connected together in parallel, to a common output-circuit 12, which thus has a voltage corresponding to the largest one of the impressed alternating-current input-voltages of the network. These output-terminals 12 are used to energize the operating-coil 9 of the modified impedance relay MZ. If desired, the output-terminals 12 can be shunted by a ripple-suppressing capacitor 13. The principles of this maximum-voltage network $E_{max}$ are further explained in the previously mentioned Harder patent.

In accordance with my invention, the restraint-magnet 8 of the modified impedance relay MZ is energized in accordance with the minimum one of three $(E+I)$ quantities, as selected by a minimum-voltage network $E_{min}$. The type of minimum-voltage network $E_{min}$ which has been selected for illustration in the drawing is one of the forms of network which is disclosed in my previously mentioned copending application. It comprises three rectifier-bridges 14 which are respectively energized by means of three different $(E+I)$ quantities, one for each phase.

The positive terminals 15 of the three bridges 14 of the minimum-voltage network $E_{min}$ are all connected together, and to a common positive bus $(+)$, which represents the positive terminal of an auxiliary direct-current source, such as a station-battery, the negative terminal of which is indicated at $(-)$. The negative terminals of the three bridges 14 are indicated at 16A, 16B and 16C respectively, and these are connected, through individual rectifiers RA, RB and RC respectively, to a common negative bus 17 which is used to energize one terminal of a restraining winding 18 on the restraint-magnet frame 8, the other terminal of the restraining winding 18 being connected to the negative source-terminal $(-)$. The three rectifiers RA, RB and RC conduct current in the direction toward the common negative bus 17. The direct-current output-terminals of the several bridges 14 are shunted by individual shunting-resistors 19, each of which is preferably shunted, also, by means of a ripple-suppressing capacitor 20. The minimum-voltage network $E_{min}$ also uses an operating winding 21 which is also mounted upon the restraint-magnet frame 8, and which is directly energized across the positive and negative terminals $(+)$ and $(-)$ of the auxiliary direct-current source, in such polarity as to oppose the ampere-turns of the restraint-coil 18.

The three $(E+I)$ quantities which are used to energize the rectifier-bridges 14 of the minimum-voltage network $E_{min}$ are compounded of a voltage response which is obtained from the appropriate potential-transformer 5A, 5B or 5C, as the case may be, plus a current-response which is preferably obtained, as shown in the illustrated form of embodiment of my invention, by means of an auxiliary air-gap current-transformer or mutual reactance $jM$, one for each phase. Each of these mutual reactances $jM$ has an adjustably tapped primary winding 23, which is energized from its corresponding phase of the line-current transformers 4. Each mutual reactance $jM$ also has a secondary winding 24 which is connected in series with the voltage-leads of the corresponding phase of the potential-transformers 5A, 5B or 5C, as the case may be. The phase of the current-component which is thus introduced in series with the line-voltage response is adjustable by any suitable means, a simple, and usually adequate, phase-adjustment means being illustrated in the form of a variable resistor 25 which is shunted across a portion of the secondary winding 24 of each of the mutual reactances $jM$.

In the operation of my device, the maximum-voltage network $E_{max}$ selects the largest voltage which is produced by the passage of the various line-currents through the several resistances or impedances ZA, ZB and ZC, respectively. This impresses, on the direct-current output-terminals 12 of the three rectifier-bridges 11, a voltage corresponding to the magnitude of the rectified voltage of the largest input-phase. Assuming that the rectifier-bridges 11 of the two other input-phases do not conduct any current in the non-conducting direction, and assuming that these two other input-phases have voltages which are smaller, in magnitude, than the largest phase, then no current can flow in these two bridges 11 corresponding to said two smaller phases, and thus the largest phase is selected by the network. This applies, to the operating magnet 7 of the relay MZ, a voltage corresponding, in magnitude, to the largest of the three line-currents, and hence corresponding to the current in the faulted phase.

The minimum-voltage network $E_{min}$ responds, as follows, to the smallest of the three voltages which are impressed upon the rectifier-bridges 14. Assuming, for example, a phase-A fault, it will be obvious that the phase-A line-voltage will be the smallest of the three line-voltages, and I have found that, in general, the $(E+I)$ quantity, in this phase, will also be the smallest of the three $(E+I)$ quantities, particularly when the magnitude of the current-component which is vectorially added to the voltage-component is not too large, and considering the fact that this current-component is dephased with respect to the voltage-component.

Assuming a phase-A fault, therefore, the output of the phase-A rectifier-bridge 14 of the minimum-voltage network $E_{min}$ will impress the rectified phase-A $(E+I)$ voltage across the terminals of the corresponding loading-resistor 19, so that the restraint-coil 18 will be impressed with a voltage equal to the voltage E of the auxiliary source having the terminals $(+)$ and $(-)$, minus the rectified phase-A $(E+I)$ voltage, the energizing-current for this restraint-coil 18 being supplied by means of the phase-A rectifier RA. Assuming that the other two rectifiers RB and RC do not carry any current in their reverse-current direction, and assuming that the impressed voltages on the phase-B and phase-C bridges 14 are smaller than the voltage impressed upon the phase-A bridge 14, it will be evident that the negative bridge-terminals 16B and 16C will be more negative than the common negative bus 17, but no current can flow thereto from said common negative bus 17, by reason of the rectifiers RB and RC, thus causing the restraint-coil 18 to be impressed with the difference between the source-voltage E and the rectified voltage of the minimum $(E+I)$ quantity. The energization of the operating coil 21 on the restraint-magnet 8 of the relay MZ is responsive to the source-voltage E, and of such magnitude as to cancel the E part of the energization of the restraint-coil 18, leaving a response solely to the smallest of the three $(E+I)$ quantities of the line.

The modified impedance relay MZ, as explained in my previously mentioned patents, particularly Patent No. 2,393,983, has a characteristic response-circle which is triply adjustable, the circle-radius being adjustable by adjusting the strength of the energization of the operating-coil 9, as by adjusting the taps thereon, while the amount of center-displacement of the circle with respect to the origin of the rectangular coordinates is determined by the tap-adjustment on the primary windings 23 of the three mutual reactors $jM$, and the angle of the line in which the circle-center is displaced is determined by the adjustment of the phase-adjusting means 25.

It will be understood, of course, that my present invention would be used as a part of a much larger, more complex relaying system, with provisions for ground-fault protection, and usually also various forms of back-up protection, with supervision in response to the direction of the line-current, and sometimes also carrier-current supervision, none of which details are shown in the drawing. It will also be understood that the example which I have given is only illustrative. I could have used other means for deriving the $(E+I)$ quantities, other forms of maximum or minimum-voltage networks, other types of reactance relays, and the like, although the illustrated example has considerable merit. I wish it to be understood, therefore, that my invention, in its broadest aspects, is subject to considerable modification, in the way of additions, omissions, and the substitution of equivalents, and I desire that the appended claims be given the broadest interpretation consistent with their language.

I claim as my invention:

1. A single-element relay for a polyphase line, said relay having two energizing-means for producing two relay-fluxes, a maximum-voltage network for energizing one of said energizing-means, and a minimum-voltage network for energizing the other of said energizing-means, said maximum-voltage network having a plurality of alternating-current input-circuits and a plurality of rectifier-means for energizing a common direct-current output-circuit in accordance with the largest of the input-voltages, means for energizing the respective input-circuits of the maximum-voltage network in accordance with the voltage-drops across a plurality of impedances traversed by different line-currents of the polyphase line, said minimum-voltage network having a plurality of input-circuits and a plurality of rectifier-means for energizing a common direct-current flux-producing means in accordance with the smallest of the input-voltages, and means for energizing the respective input-circuits of the minimum-voltage network in accordance with the vectorial sums of different $(E+I)$ quantities, in different phases of the polyphase line, where E and I are relatively dephased line-voltages and line-currents, respectively, the line-current responses I being sufficiently small so that the $(E+I)$ quantity in the faulted phase is in general the smallest of the plurality of $(E+I)$ quantities.

2. The invention as defined in claim 1, characterized by said relay being a differential relay having an operating means which is responsive to the output of the maximum-voltage network, and having a restraining means which is responsive to the output of the minimum-voltage network.

SHIRLEY L. GOLDSBOROUGH.

REFERENCES CITED

The following references are of record in the file of this patent:

UNITED STATES PATENTS

| Number | Name | Date |
|---|---|---|
| 2,393,043 | Harder | Jan. 15, 1946 |
| 2,393,983 | Goldsborough | Feb. 5, 1946 |
| 2,426,062 | Sonnemonn | Aug. 19, 1947 |
| 2,479,345 | Goldsborough | Aug. 16, 1949 |

FOREIGN PATENTS

| Number | Country | Date |
|---|---|---|
| 589,153 | Germany | Dec. 4, 1933 |